April 30, 1968 K. M. RINGER ET AL 3,381,237
RADIO FREQUENCY DEVICE AND RESONATOR THEREFOR
Original Filed June 20, 1960 3 Sheets-Sheet 1

Inventors
Kenneth M. Ringer
Andrzej B. Przedpelski
By: Frot, Burmeister and Kulie
Attorneys Inventors
Kenneth M. Ringer
Andrzej B. Przedpelski
By: Frost, Burmeister and Kulie
Attorneys Inventors
Kenneth M. Ringer
Andrzej B. Przedpelski
By: Frost, Burmeister and Kulie
Attorneys

United States Patent Office 3,381,237
Patented Apr. 30, 1968

3,381,237
RADIO FREQUENCY DEVICE AND RESONATOR THEREFOR
Kenneth M. Ringer and Andrzej B. Przedpelski, Boulder, Colo., assignors to A.R.F. Products, Inc., River Forest, Ill., a corporation of Illinois
Original application June 20, 1960, Ser. No. 37,295, now Patent No. 3,152,304, dated Oct. 6, 1964. Divided and this application Oct. 2, 1964, Ser. No. 401,007
6 Claims. (Cl. 330—66)

This application is a division of the present inventors' U.S. Patent No. 3,152,304 entitled, "Transponder," filed June 20, 1960.

The present invention relates to transponders in particular, and to the construction of electronic apparatus in general.

A transponder is a part of the equipment employed to determine the distance by which a projectile misses its target. In employing this type of miss distance equipment, a weak signal is transmitted from the projectile, received by the transponder located at the target, and retransmitted by the transponder at a different frequency. As the projectile approaches the transponder, the Doppler effect causes the frequency of the signal from the transponder to be higher than it actually is, and the projectile moves away from the transponder, the Dopper effect causes the signal received by the transponder to be lower in frequency than it actually is. The transponder faithfully translates the frequency of the signals received from the projectile and preserves the frequency change which results when the projectile passes the target. The change in frequency resulting when the projectile passes the target and the rate at which the frequency changes is a measurement of the distance by which the projectile missed the target.

Since the target cannot carry large amounts of equipment, it is necessary that the transponder be small in size and light in weight. At the same time, the transponder must have relatively large gain to receive the relatively weak signals from the projectile and retransmit these signals with sufficient amplitude to be received at a receiving station on the ground. The requirement of small size and high gain can most readily be met with present technology by the use of miniature vacuum tubes, but such tubes produce large quantities of heat for their size which must be removed from the tubes to maintain them in operation. This fact, and also the fact that the temperature must be maintained relatively constant to provide the necessary stability for frequency conversion required of such transponders, requires a construction which facilitates removal and distribution of heat. The construction of the transponder must also provide a great deal of radio frequency shielding in order to prevent regeneration at the high gains required of transponders. Also, the transponder must be constructed to withstand the environmental conditions it is subjected to, namely wide differences in temperature, substantial shock and vibration, and high humidity conditions.

It is an object of the present invention to provide a physically small, high gain electrical apparatus employing vacuum tubes with more adequate means of disposing of the heat than in presently known electronic devices.

It is also an object of the present invention to provide a transponder of great stability with greater gain than presently known transponders.

Further, it is an object of the present invention to provide a transponder of great gain which is capable of operation in widely different environmental conditions, such as temperature, humidity, shock and vibration.

These and further objects of the present invention will become readily apparent to those skilled in the art from a further consideration of this disclosure, particularly when viewed in the light of the drawings, in which.

Figure 1:
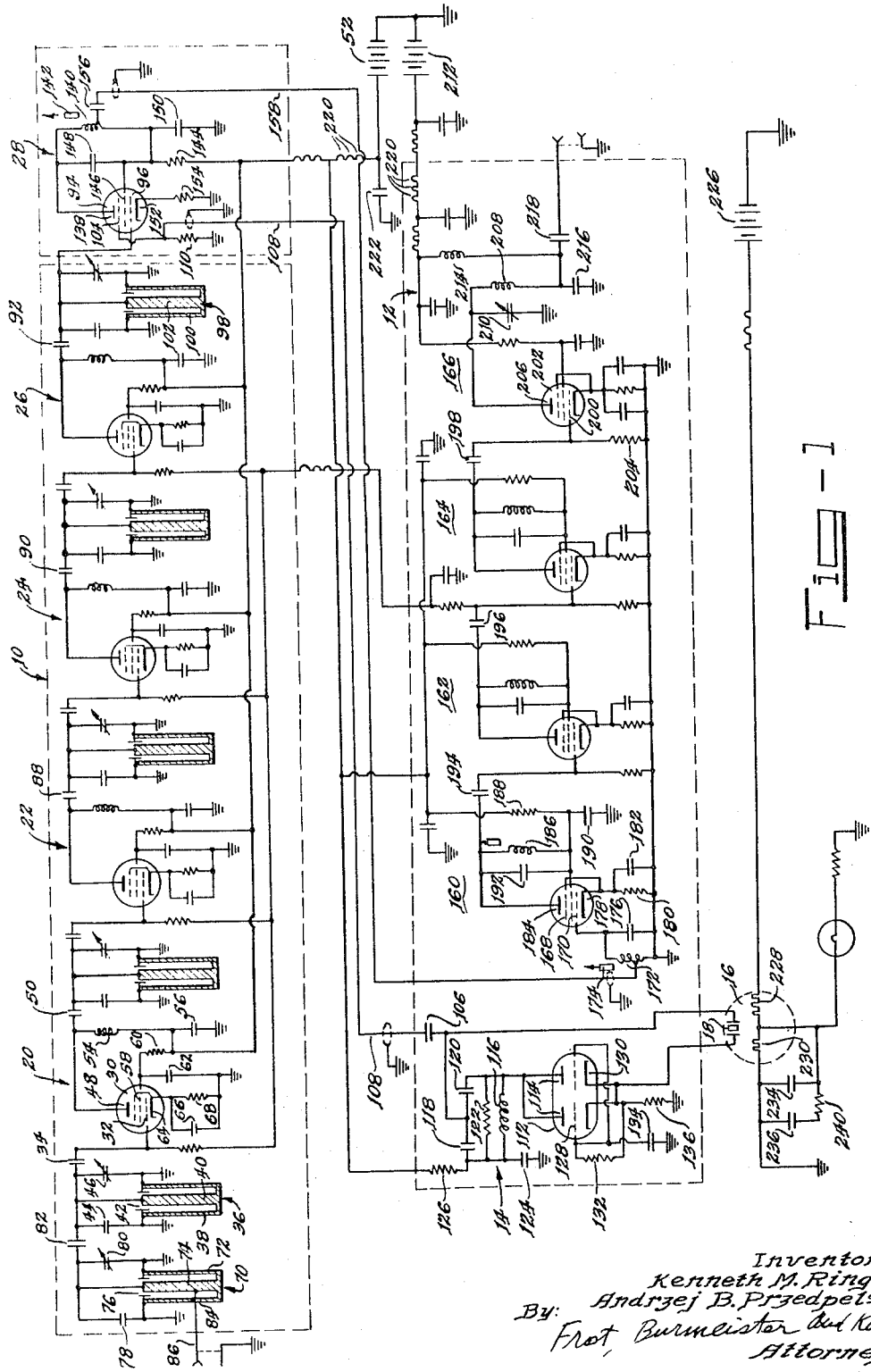
FIGURES 1 and 1A are schematic electrical circuit diagrams of a transponder constructed according to the teachings of the present invention.

The transponder illustrated in the figures may be considered to have three different sections in addition to an external power supply which has not been illustrated. The first section 10 is referred to as a radio frequency chassis The second section is an output chassis 12 which also includes part of the electronic components of an oscillafor 14. The third section of the transponder is the oven 16 which contains a crystal 18 employed by the oscillator 14, and is disposed between the sections 10 and 12.

The radio frequency chassis 10 contains four radio frequency amplification stages, designated 20, 22, 24, and 26, and a mixer stage 28. The four stages 20, 22, 24, and 26 are essentially identical, and hence only stage 20 will be described in detail. Stage 20 employs a vacuum tube 30 with a control grid 32 coupled through a capacitor 34 to a resonator 36. The resonator 36 has an outer shell 38 coaxially disposed about a central rod 40, and a coaxial capacitor 42 is disposed between the center rod 40 and the outer shell 38 at one end of the shell, the other end of the rod being shorted to the shell. The rod 40 is directly connected to the capacitor 34, and the shell 38 is connected directly to ground. Turning capacitors 44 and 46 are also connected between the shell 38 and the rod 40.

Vacuum tube 30 also has a plate 48 which forms the output terminal for the stage 20 and is coupled through a capacitor 50 to the stage 22. The plate is also connected to the positive terminal of a source of potential 52 through a radio frequency choke 54, the choke also being connected to ground through a bypass condenser 56. Vacuum tube 30 is provided with a screen grid 58 which is connected to the power source 52 through a voltage dropping resistor 60, and bypassed to ground through a capacitor 62. The cathode 64 of the vacuum tube 30 is also bypassed to ground through a capacitor 66 and resistor 68.

Immediately preceding the stage 20 is a second resonator 70 which also has a shell 72 and a coaxial rod 74 within the shell 72. One end of the resonator rod 74 is shorted to the shell 72, and the other end is provided with a coaxial capacitor 76 connected between the shell 72 and the rod 74. In a manner similar to the resonator 36, tuning capacitors 78 and 80 are connected between the shell 72 and the rod 74, and a coupling capacitor 82 interconnects the rod 74 of the resonator 70 with the rod 40 of the resonator 36. The shell 72 is provided with an aperture 84, and an electrical conductor extends through the aperture to make contact with the rod 74 between the ends thereof. The input to the radio frequency chassis 10 is impressed upon this lead, designated 86.

The stages 22, 24 and 26 are essentially identical to the stage 20 and are connected in cascade through coupling capacitors 34, 50, 88, and 90. The stage 26 is coupled to the mixer stage 28 through a coupling capacitor 92. The mixer stage 28 employs a vacuum tube 94 with a control grid 96 directly coupled to a resonator 98 of essentially identical construction to the resonator 36. The resonator 98 has a shell 100 and a rod 102, and the rod 102 is connected to the stage 26 through the coupling capacitor 92.

The oscillator 14 is coupled to a suppressor grid 104 of vacuum tube 94 of the mixer stage 28 through a coupling capacitor 106 and a shielded lead 108. A resistor 110 extends from the grid 104 to ground. The oscillator 14 employs a vacuum tube 112 containing two triode sections which are connected in parallel. The plates 114 of the vacuum tube 112 are connected to a tuned circuit containing an inductance or coil 116 and two serially connected capacitors 118 and 120. The resonance of the tuned circuit is broadened by a resistor 122 connected in parallel with the inductance or coil 116. The end of the tuned circuit opposite the plates 114 is coupled to ground through a capacitor 124 and connected to the positive terminal of the power source 52 through a resistor 126. The grids 128 of vacuum tube 112 are connected to the cathodes 130 through a resistor 132 and coupled to ground through a capacitor 134. The cathodes are also connected to ground through a resistor 136. The crystal 18 is connected between the cathodes 130 and the junction between the capacitors 118 and 120 of the resonant circuit, and the output from the oscillator is derived from this junction through capacitor 106.

In the particular construction to be described throughout this specification, the signals received by the transponder are within the range of 227.5 megacycles through 242.0 megacycles, and the frequency of the oscillator 14 is selected to provide a difference frequency so that the output of the mixer stage 28 is either 149.450 megacycles or 149.585 megacycles. This signal appears on the plate 138 of vacuum tube 94 and is connected to a tuned circuit with a coil 140 and a tuning slug 142. The positive terminal of the power source 52 is also connected to the plate 138 through the coil 140 and a resistor 144. A screen grid 146 of vacuum tube 94 is connected to the junction between the coil 140 and the resistor 144, and a capacitor 148 is connected in parallel with the coil 140. A capacitor 150 couples the screen grid 146 and coil 140 to ground. Vacuum tube 94 also has a cathode 152 which is connected to ground through a resistor 154. The output from the radio frequency chassis 10 is derived from a tap on the coil 140 through a capacitor 156 and a shielded lead 158 which is connected to the input terminal of the output chassis 12.

The output chassis 12 has three voltage amplification stages 160, 162 and 164 and a power amplifier stage 166. Since the voltage amplifier stages are of similar construction, only stage 160 will be described in detail. This stage 160 employs a vacuum tube 168 which is provided with a control grid 170. The control grid 170 is connected to a coil 172 which is tuned by a slug 174. The shielded lead 158 extending from the output of the stage 28 of the radio frequency chassis 10 is connected to a tap of the coil 172 and achieves coupling to the stage 160. A tuning capacitor 176 is also connected in parallel with the coil 172 and to ground. Vacuum tube 168 also has a cathode 178 connected to ground through a resistor 180 and a capacitor 182 connected in parallel with the resistor 180.

Vacuum tube 168 has a plate 184 connected to a slug tuned inductance 186, and the inductance 186 is connected to the positive terminal of the power source 52 through a resistor 188 and to ground through a capacitor 190. A tuning capacitor 192 is also connected in parallel with the inductance 186. A coupling capacitor 194 interconnects the output of the amplifier stage 160 to the input of the stage 162, and in like manner a capacitor 196 couples the output of the stage 162 to the input of the stage 164. A capacitor 198 couples the output of the voltage amplification stage 164 to the grid 200 of a vacuum tube 202 of the power amplifier stage 166.

A grid resistor 204 extends from the grid 200 to ground, and vacuum tube 202 has a plate 206 connected to a tuned circuit comprising a coil 208 and a capacitor 210. A second power source 212 has a positive terminal connected to the plate 206 through a choke 214 and the coil 208, the junction between the choke and the coil being connected to ground through a capacitor 216. A coupling capacitor 218 connected to this junction forms the output terminal of the unit.

Figure 1A:
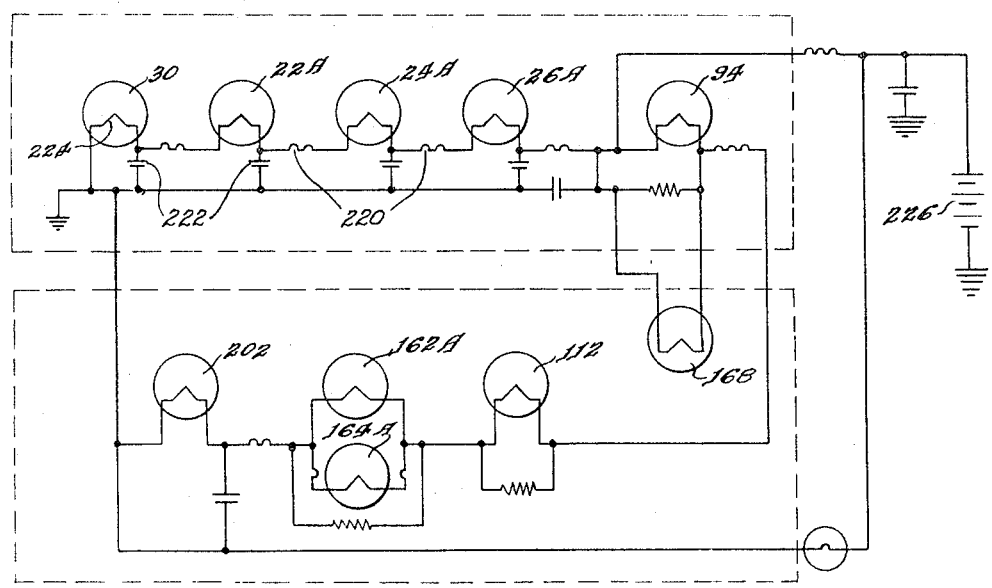
Figure 2:
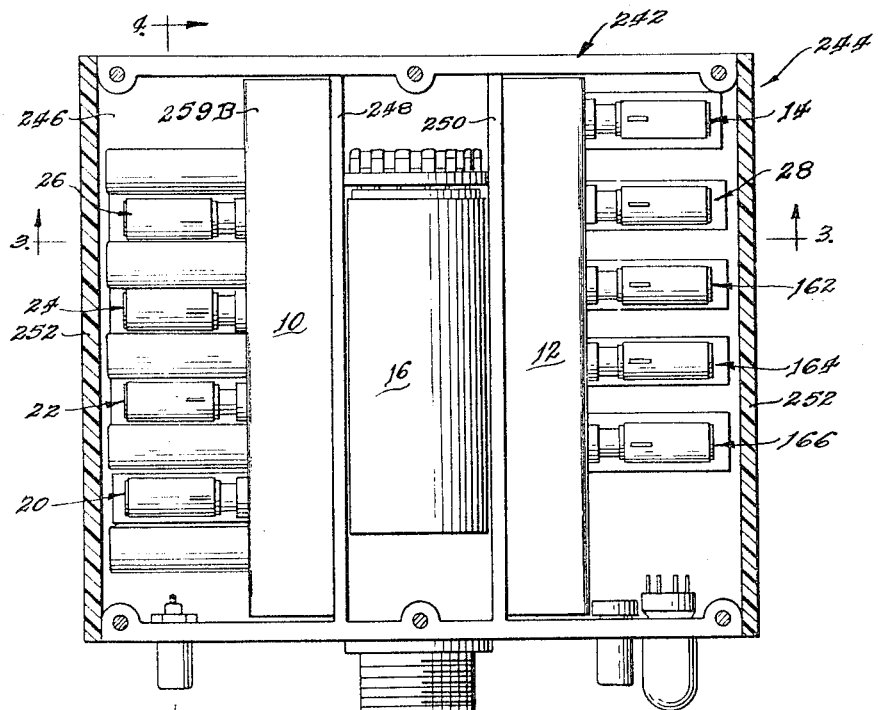
FIGURE 2 is a plan view of a transponder embodying the electrical circuit illustrated in FIGURE 1, the cover having been removed.

Electrical isolation is greatly enchanced by the use of ferrite beads 220 disposed about power leads between stages. The use of these lossy shielding ferrite beads, which extend entirely about the power lines in conjunction with bypass capacitors 222, to a large extent eliminate coupling between stages. The lossy ferrite beads and bypass capacitors are employed both in the B+ power lines and in the filament leads. As indicated in FIGURE 1A, the filaments of the vacuum tubes employed in the transponder are serially connected, the tubes of stages not specifically described being indicated by reference numerals 22A, 24A, 26A, 162A and 164A to indicate the vacuum tubes of stages 22, 24, 26, 162 and 164, respectively. The use of lossy ferrite beads 220 between the heaters 224 of these stages and also the bypass capacitors 222 are indicated in FIGURE 1A.

Figure 3:
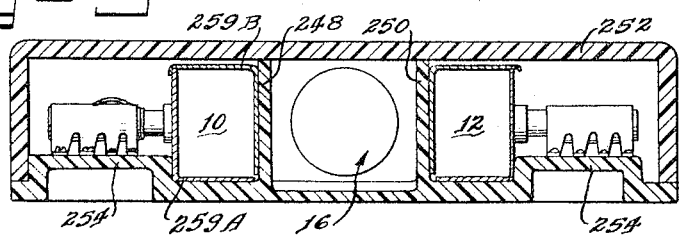
FIGURE 3 is a sectional view taken along the line 3—3 of FIGURE 2.
Figure 4:
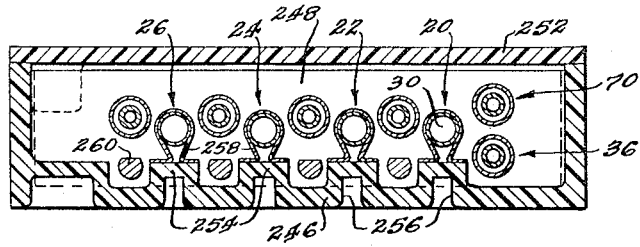
FIGURE 4 is a sectional view taken along line 4—4 of FIGURE 2.
Figure 5:
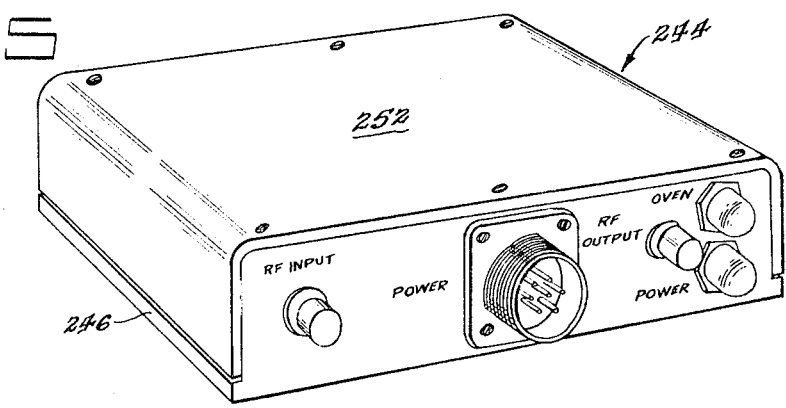
FIGURE 5 is an isometric view of the transponder illustrated in FIGURES 1 through 4.

The oven 16 contains the crystal 18 of the oscillator 14 and is heated by a power source 226 connected in a series circuit with a resistor 228 within the oven and a pair of thermostatically controlled contacts 230 within the oven. A capacitor 234 is connected in parallel with the contacts 230, and a capacitor 236 and resistor 240 are connected in parallel with the capacitor 234. The oven thus maintains the crystal 18 at an essentially constant temperature. As illustrated in FIGURES 2 through 5, the input chassis 10, output chassis 12, and oven 16 are mounted on a single supporting frame 242 of the housing 244, the frame being preferably a rugged casting of material having a good thermal and electrical conductivities. The frame 242 has a flat base portion 246 from which two parallel walls 248 and 250 extend. The oven 16 is disposed between the walls 248 and 250. The radio frequency chassis 10 is disposed on the opposite side of the wall 248 from the oven 16, and the output chassis 12 is disposed on the opposite side of the wall 250 from the oven 16. The housing 244 is completed by a cover 252 extending thereover as indicated in FIGURES 3 through 5. The base plate 246 is provided with a plurality of protrusions 254 which extend toward the cover 252 and provide indentations 256 on the side of the base plate 246 opposite the cover 252. The protrusions 254 extend toward the walls 250 and 248, but are spaced from the walls by a sufficient distance to accommodate the chassis of the radio frequency section 10 and output section 12, and the vacuum tubes associated with these chassis extend over and in adjacency to the protrusions 254.

A sleeve 258 of electrically conducting material of high thermal conductivity is secured to each of the protrusions 254 and is disposed about the envelope of each of the vacuum tubes. The sleeves 258 may be riveted or bolted, for example, to the protrusions 254, and serve the purposes of electrically shielding the vacuum tubes, anchoring the vacuum tubes to the base 246 to withstand shock and vibration, and conducting thermal energy from the tubes to the base 246. The indentations 256 increase the surface immediately adjacent to the protrusions to facilitate transfer of heat from the housing 244 by radiation and convection.

The chassis 10 and 12 are formed of two L-shaped portions 259A and 259B which are mounted together to form a rectangular closed unit. The portions 259B are disposed parallel and adjacent to the wall 248 or 250 and provide substantially greater electrical shielding in combination with the wall than the chassis would afford alone.

It is to be noted that the rotatable shafts of the tuning capacitors 80, 46 etc. employed in conjunction with the resonators 70, 36, 98 etc. extend from the radio frequency chassis 10 between the protrusions 254 of the base 246. These shafts, designated 260, are thus accessible from the exterior of the housing when the cover 252 is removed, and the resonators are positioned between the vacuum tubes and in alignment with the capacitor shafts. This construction results in optimum utilization of space and optimum electrical shielding to prevent instability.

Figure 6:
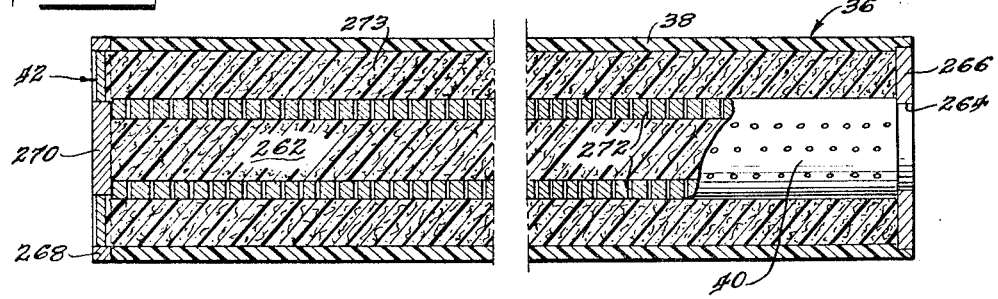
FIGURE 6 is a longitudinal sectional view of one of the tuned circuits employed in the transponder shown schematically in FIGURE 1 and physically in FIGURES 2 and 4.

The construction of one of the resonators 36 is best illustrated in FIGURE 6. This resonator has a shell 38 coaxially surrounding rod 40, as stated above. The rod 40 is provided with an axial channel 262 which terminates in an aperture 264 in a cap 266 which is secured to the end of the shell 38. The coaxial capacitor 42 has an outer ring 268 which is secured and electrically connected to the opposite end of the shell 38, and a central button 270 is secured to this end of the hollow shaft 40 opposite the cap 266. The hollow rod 40 is provided with perforations 272, and an epoxy foam 273 fills the region between the rod 40 and the shell 38 and the channel 262 within the rod. The epoxy foam of closed cellular construction is forced through the aperture 264 into the rod 40 and through the perforations 272 to the region between the rod 40 and the shell 38. The epoxy foam is selected for the purposes of hermetically sealing the resonators and preventing humidity conditions from developing therein. Further, the epoxy foam prevents changes in the electrical characteristics of the resonators with temperatures and ambient pressure changes, but avoids the mechanical stresses and strains resulting from ambient pressure changes exerted upon a sealed unit since the epoxy foam is not rigid to the same approximation as a metallic seal but has resilience.

The resonators 36 and 70 are quarter wave length resonant coaxial lines which possess very high Q and are shortened by the coaxial capacitors 42 and 76. By employing two such quarter wave length coaxial resonant lines before the first vacuum tube 30 of the radio frequency amplifier 10, a gain of 9 to 10 decibels is achieved which results in a transponder of great sensitivity. The stages 20, 22, 24 and 26 amplify the signals received by the first resonant coaxial line 70, and the mixer stage 28 converts the frequency of these signals to the output frequency of the transponder. The stages 160, 162 and 164 are voltage amplification stages, and the stage 166 is a power output stage which is designed to achieve an output of at least 2 watts in the particular construction described herein. The high gain of the radio frequency amplification stages 20, 22, 24 and 26 and the mixer stage 28 can only be achieved by providing excellent electrical shielding. The electrical stability is achieved by use of the quarter wave coaxial resonators here described, the electrical shielding properties of the housing including the base 246, the impedance of the lossy ferrite beads 220 in conjunction with the bypass capacitors 222, and the double shielding which is achieved by means of the chassis and walls 248 and 250 of the base 246. Further, the short electrical leads between the quarter wave length resonators, the vacuum tubes, and the tuning capacitors for the resonators also attribute to the electrical isolation between stages.

The vacuum tubes 48 employed in radio frequency stages 20, 22, 24 and 26 are type 5840 tubes in the embodiment described herein, and vacuum tube 94 employed in the mixer stage 28 is a type 5784WB. The vacuum tubes employed in the voltage amplification stages 160, 162 and 164 are type 5702WB, and the power output stage 166 employs a vacuum tube 202 of a type 5639WA. These tubes become overheated when operated in air alone, and it is necessary to provide forced or auxiliary convection and radiation cooling. By mounting vacuum tubes on the base 246 of the housing 244, heat is conducted from the tubes and prevents overheating. Further, the housing 244 itself is provided with a sufficient surface area to dispose of all necessary heat by radiation alone, although in practice the housing is generally mounted on the frame of a drone to aid in the removal of heat therefrom. The temperature controlled oven, being located between the radio frequency chassis 10 and the output chassis 12, utilizes the heat generated by these chassis to aid in maintaining the constant temperature necessary for the crystal of the oscillator 14.

From the foregoing disclosure, those skilled in the art will devise modifications and improvements upon the devices here disclosed which are within the intended scope of the present invention. It is therefore intended that the scope of the present invention be not limited by the foregoing disclosure, but rather only by the appended claims.

We claim:

1. A resonator comprising a hollow cylindrical shell, a hollow perforated rod coaxially disposed within the shell, a cap mounted on one end of the shell and the rod, a coaxial capacitor mounted between the other end of the shell and the other end of the rod, and electrically insulating closed cellular foam material disposed in the spaces between the rod and the shell and within the rod.

2. A resonator comprising a hollow shell, a rod mounted at one end on the shell and extending centrally within the shell, and a mass of electrically insulating closed cellular foam material disposed in the spaces between the rod and the shell and forming an air-tight seal to the shell and the rod.

3. A resonator comprising the combination of claim 2 wherein the foam plastic material comprises an epoxy plastic.

4. A resonator comprising the combination of claim 3 in combination with a coaxial capacitor having one conductor mounted on the rod and the other conductor mounted on the shell, the foam plastic material abutting the capacitor and forming an air-tight seal thereto.

5. An electronic device comprising, in combination, a housing constructed of material having high coefficients of thermal and electrical conductivity having a plate shaped base with two integral parallel spaced walls extending from one side of the base, and a cover enclosing the walls and abutting the base, an oven mounted on the base between the walls containing a temperature controlled heat source, a first chassis mounted on the base on the side of one of the walls opposite the oven and electrically connected to the base, a second chassis mounted on the base on the side of the other wall opposite the oven and electrically connected to the base, a first group of electronic circuit components mounted on the first chassis and connected in a radio frequency electrical circuit including thermionic vacuum tubes extending from the side of the first chassis remote from the walls parallel to the base, a second group of electronic circuit components mounted on the second chassis and electrically connected in an electrical circuit including thermionic vacuum tubes extending from the side of the second chassis opposite the walls parallel to the base, the tubes of the first and second chassis begin snugly disposed within the sleeves of thermal and electrical conducting material, the sleeves being mounted on the base and electrically connected thereto, a resonator electrically connected to a tube of the first chassis, said resonator having a hollow cylindrical shell, a hollow perforated rod coaxially disposed with the shell, a cap mounted on one end of the shell and rod, a coaxial capacitor mounted between the other end of the shell and the other end of the rod, and electrically insulating foam material disposed in the spaces between the rod and the shell and within the rod.

6. A radio frequency amplifier for use in a transponder comprising, in combination, a housing constructed of electrically conducting material having a high coefficient of thermal conductivity including a plate-shaped base, a chassis mounted on the base and electrically connected thereto, a group of electrical circuit components mounted on the chassis and electrically connected in a radio frequency amplifier circuit including a plurality of thermionic vacuum tubes mounted on the chassis and extending from a side thereof generally parallel to the base, an electrically and thermally conducting sleeve snugly disposed by each of the plurality of vacuum tubes in thermal relation therewith, each of said sleeves being mounted on the base and in thermal and electrical communication therewith, a resonator mounted on the chassis adjacent to each of said plurality of vacuum tubes and electrically connected to said tube, each resonator comprising a hollow cylindrical shell of electrically conducting material, a hollow perforated rod of electrically conducting material disposed within the shell, an electrically conducting cap mounted on one end of the rod and on the shell, a coaxial capacitor mounted between the other end of the shell and the other end of the rod, and a mass of electrically insulated closed cellular foam material disposed in the spaces between the rod and the shell and within the rod.

No references cited.

ROY LAKE, *Primary Examiner.*

NATHAN KAUFMAN, *Examiner.*